United States Patent [19]

Dion et al.

[11] Patent Number: 4,779,540
[45] Date of Patent: Oct. 25, 1988

[54] ACCESSORY TABLE FOR BUSINESS AND DOMESTIC USE

[76] Inventors: Michel Dion, 565 Road 143, Windsor, Canada; Daniel Hebert, 231 Quebec Street, Sherbrooke, Canada, J1H 3L6

[21] Appl. No.: 9,191

[22] Filed: Jan. 30, 1987

[51] Int. Cl.⁴ .............................................. A47B 57/00
[52] U.S. Cl. ........................................ 108/98; 108/95
[58] Field of Search ................. 108/98, 95, 108, 103, 108/92, 93, 94, 139, 142, 152, 64, 65, 150

[56] References Cited

U.S. PATENT DOCUMENTS

| | | | |
|---|---|---|---|
| 531,257 | 12/1894 | Bond | 108/103 |
| 550,443 | 11/1895 | Deal | 108/152 X |
| 570,311 | 10/1896 | Kidder | 108/95 |
| 1,066,931 | 7/1913 | Mack | 108/98 |
| 1,115,273 | 10/1914 | Beechie | 108/95 |
| 1,173,227 | 2/1916 | Thorniley | 108/152 X |
| 1,901,174 | 3/1933 | Kusterle | 108/95 |
| 2,195,366 | 3/1940 | Haigh . | |
| 2,558,323 | 6/1951 | Strun . | |
| 2,710,051 | 6/1955 | Greenberg . | |
| 3,033,627 | 4/1961 | Brown et al. . | |
| 3,083,052 | 3/1963 | Thorson | 108/152 X |
| 3,381,635 | 5/1968 | Pforr | 108/150 |
| 3,397,010 | 8/1968 | Leimgruber | 297/174 |
| 3,908,565 | 9/1975 | Burnett | 108/103 X |
| 4,307,672 | 12/1981 | Shikimi | 108/139 |
| 4,579,311 | 4/1986 | Spranza, III | 108/94 X |
| 4,687,167 | 8/1987 | Sicalka et al. | 108/103 X |

FOREIGN PATENT DOCUMENTS

| | | | |
|---|---|---|---|
| 134993 | 10/1949 | Australia | 108/98 |
| 59013 | 2/1898 | Canada . | |
| 294k69 | 8/1929 | Canada . | |
| 116559 | 2/1927 | Switzerland | 297/194 |

Primary Examiner—Kenneth J. Dorner
Assistant Examiner—José V. Chen

[57] ABSTRACT

An accessory table adapted for detachable attachment to an article of furniture, such as a desk, is disclosed. The accessory table comprises a rigid floor supported post and an attachment assembly for the post, exerting vise action on the top and bottom surfaces of the desk. The post carries at least one table at the outer end of an arm, the latter being pivotable through a full circle. The table is also rotatable about its central vertical axis at the end of the arm. The post is hidden by an aesthetic sheath.

1 Claim, 4 Drawing Sheets

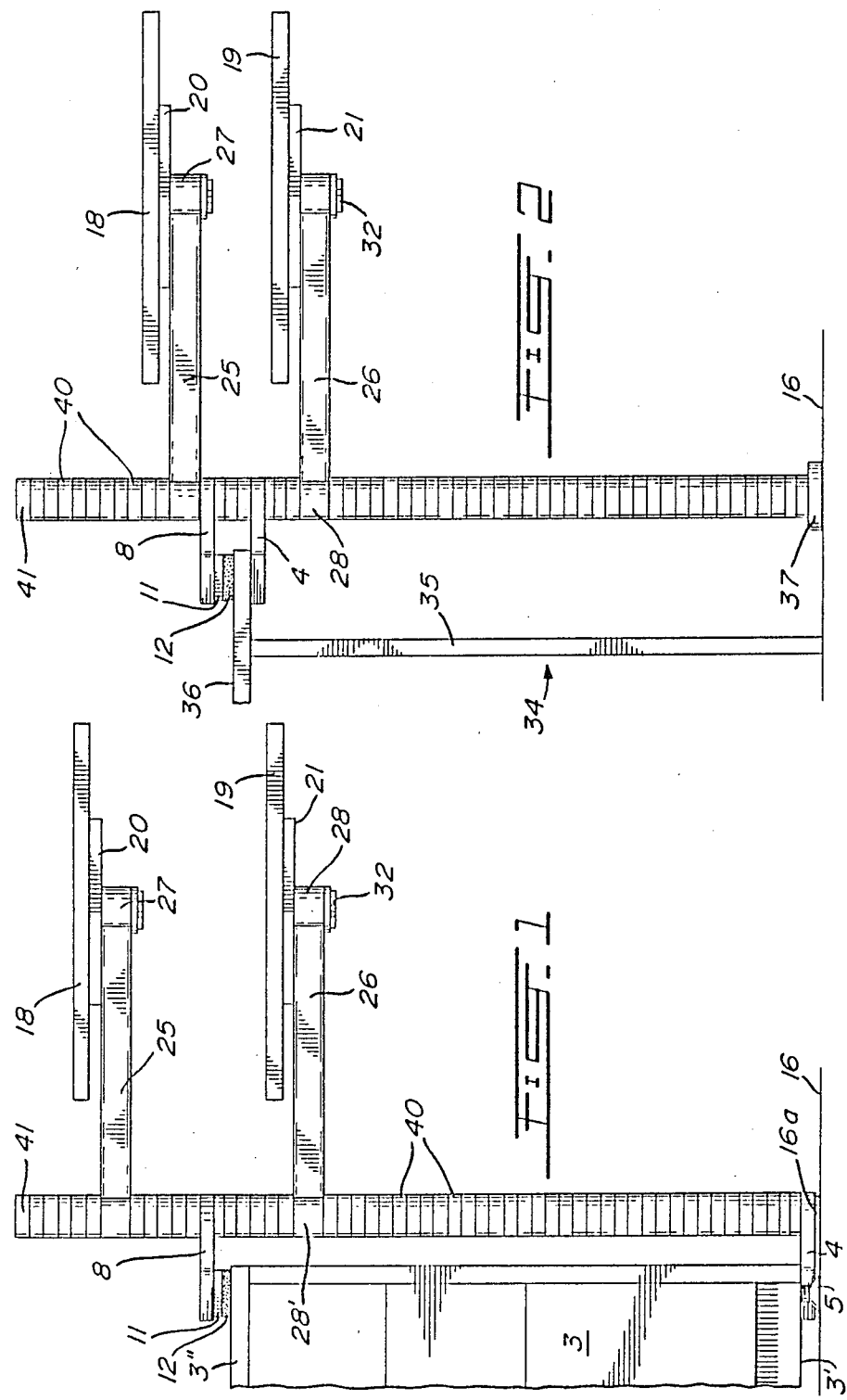

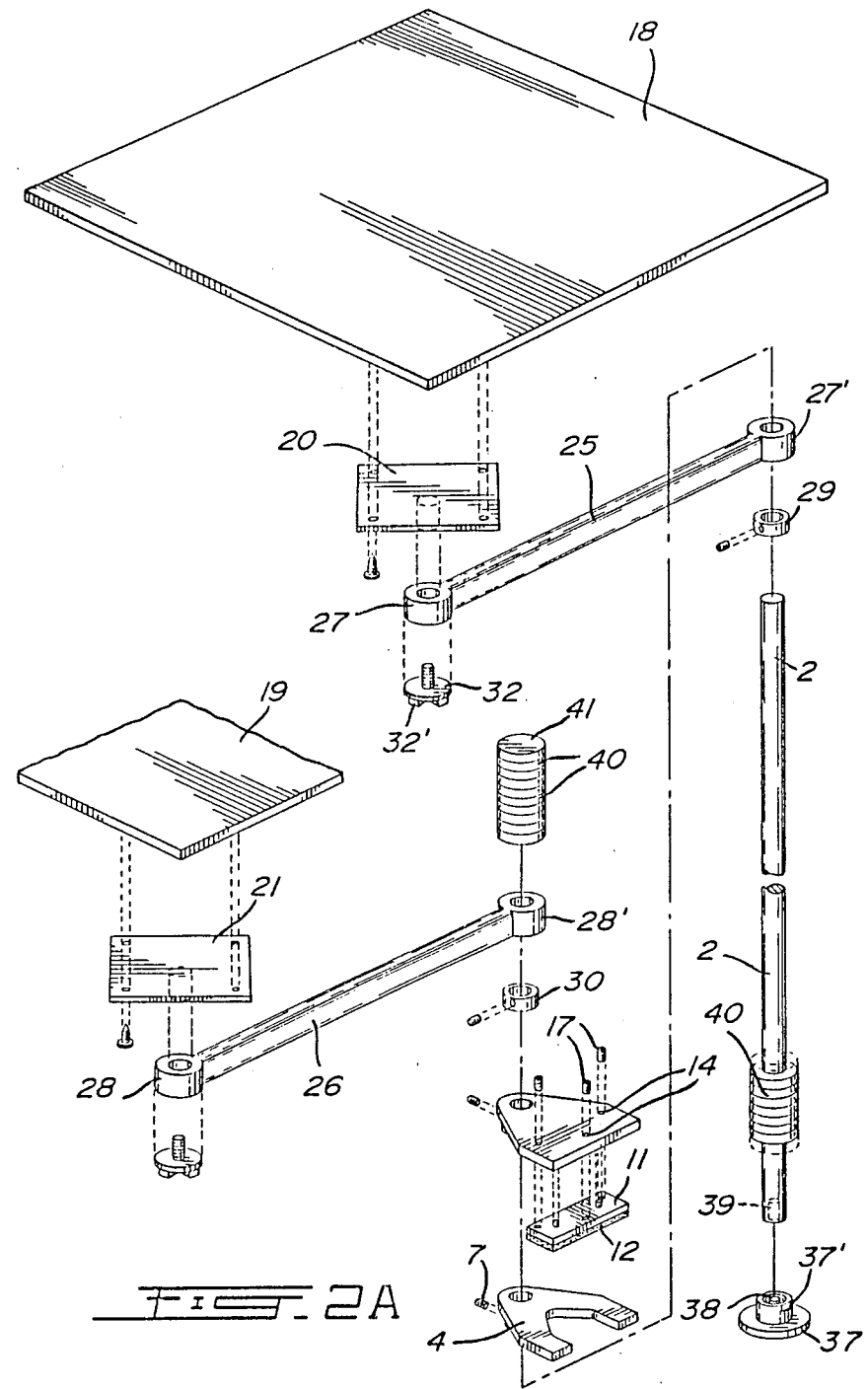

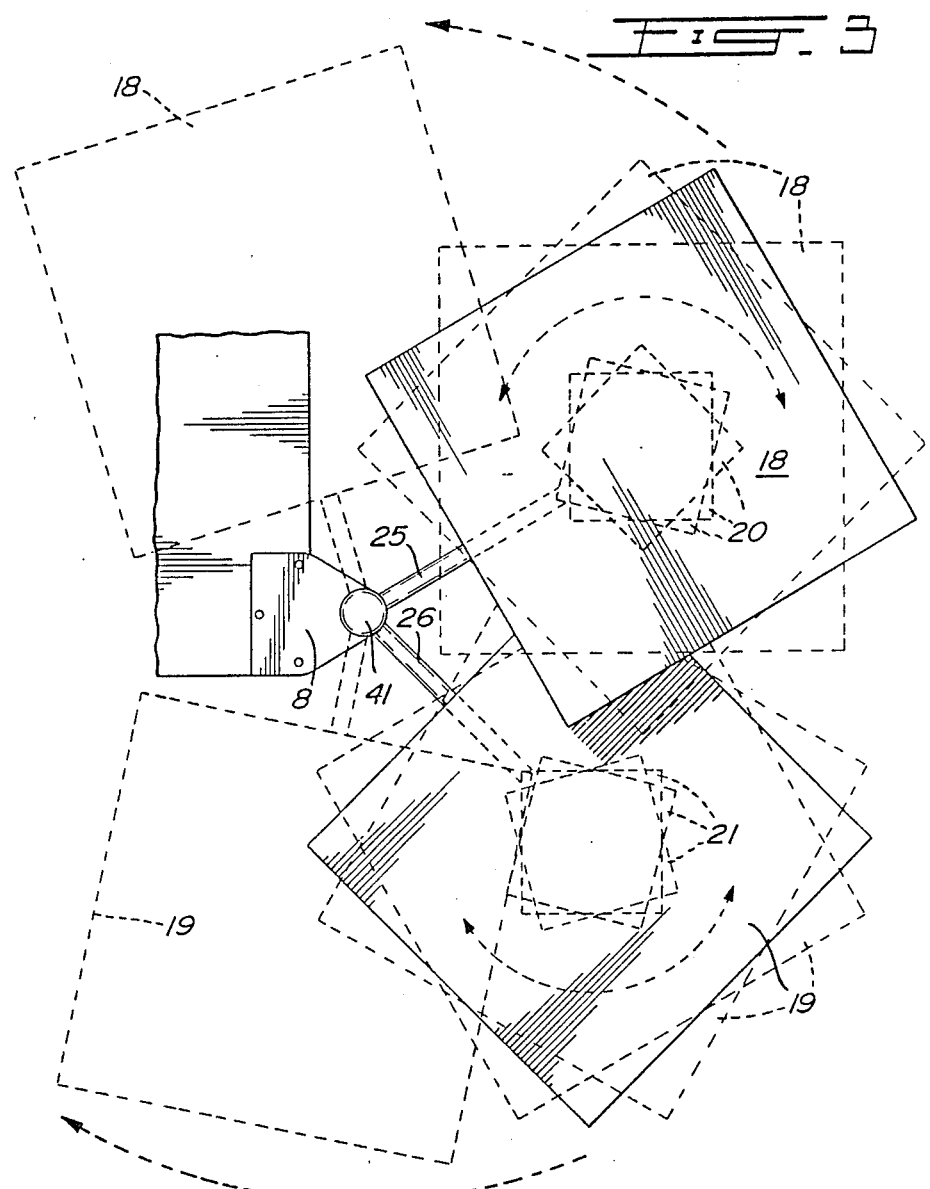

ACCESSORY TABLE FOR BUSINESS AND DOMESTIC USE

FIELD OF THE INVENTION

The present invention relates generally to furniture and accessories therefor, more specifically to such an accessory table which is designed for an office but not exclusively so.

BACKGROUND OF THE INVENTION

Since more and more commercial and industrial business offices are availing themselves of electronic items, such as computers along with their keyboards and printers, and word processors, there is a proportionally-growing need for office furniture, such as support tables, to accommodate the new equipment. Of those companies which can afford to purchase such furniture after having purchased the expensive electronic items, many have, however, experienced some problems. One major problem is that the support table must be frequently put in cramped space, so that the user who wishes to use, for example, the computer display screen must displace himself or herself away from his or her work place. Another related problem is that, if several users must have access to the equipment during the work day, then each user may have to leave his or her work place several times during the day. Moreover, the new furniture does not always harmonize with existing office furniture. Yet another problem is that existing support tables tend to occupy too much space.

A search of the prior art reveals various service attachments and auxiliary tables, none of which are ground or floor supported. This last feature is essential within the scope of the present invention as disclosed below.

OBJECTS OF THE INVENTION

It is therefore an important object of the present invention to provide an accessory table which obviates the above-stated problems.

It is another object of the present invention to provide an accessory table of the above type, which is very mobile on its support.

It is yet another object of the present invention to provide an accessory table of the above type, which is very easy to install.

It is still another object of the present invention to provide an accessory table of the above type, which can support a heavy load and which is adaptable to any type of desk, bureau or table, whether in an office or domestically.

SUMMARY OF THE INVENTION

The above and other objects and advantages of the present invention are realized according to a preferred embodiment comprising each a rigid vertical support post, which is adapted to be secured to a side of an article of furniture, such as a desk. The post will preferably extend very close to the desk side. The lower end of the post is provided with a floor-engaging base.

At least one horizontal table is pivotally attached to the upper portion of the post at the outer end of an arm which is preferably arranged to be pivotable through a full circle. The table is preferably rotatively mounted on the arm and is adapted to support, for example, a computer display screen.

An attachment assembly is provided to secure the post to a desk. Such assembly is essentially a vise and comprises an upper and a lower clamp plate member secured to the post in vertically-spaced relationship. Each clamp plate is provided with a primary locking means to lock the plates to the post at a selected height. Thus, the lower plate will be locked into a position in which it partially extends under a bottom surface of the desk to abut the latter. In one arrangement, the lower plate serves doubly as the base for the post. The upper plate similarly partially extends over the top surface of the desk. In association with the upper plate, a secondary locking means is further provided, which is adapted to exert vise action by putting forth a further downward force on the desk top, thereby rigidly locking the post in position at the desk side, and with the post firmly contacting the floor.

BRIEF DESCRIPTION OF THE DRAWINGS

The above will be more clearly understood by having referral to the preferred embodiment of the invention, illustrated by way of the accompanying drawings, in which:

FIG. 1 is a front elevation of a first arrangement of the parts of the accessory table according to the invention, also showing a portion of one type of work desk;

FIG. 2 is a front elevation of a second arrangement of the parts of the same accessory table according to the invention, also showing a portion of another work desk;

FIG. 2a is another exploded perspective view, but of the arrangement shown in FIG. 2;

FIG. 3 is a top plan view of the invention attached to the corner of a desk, showing in dashed outline how the tables may pivot and rotate; and FIGS. 4 and 5 are vertical cross-sections of the lower clamp plate and of the floor-engaging base, respectively.

Like numerals indicate like elements throughout the drawings.

DETAILED DESCRIPTION OF THE PREFERRED EMBODIMENT

Figure 1A:
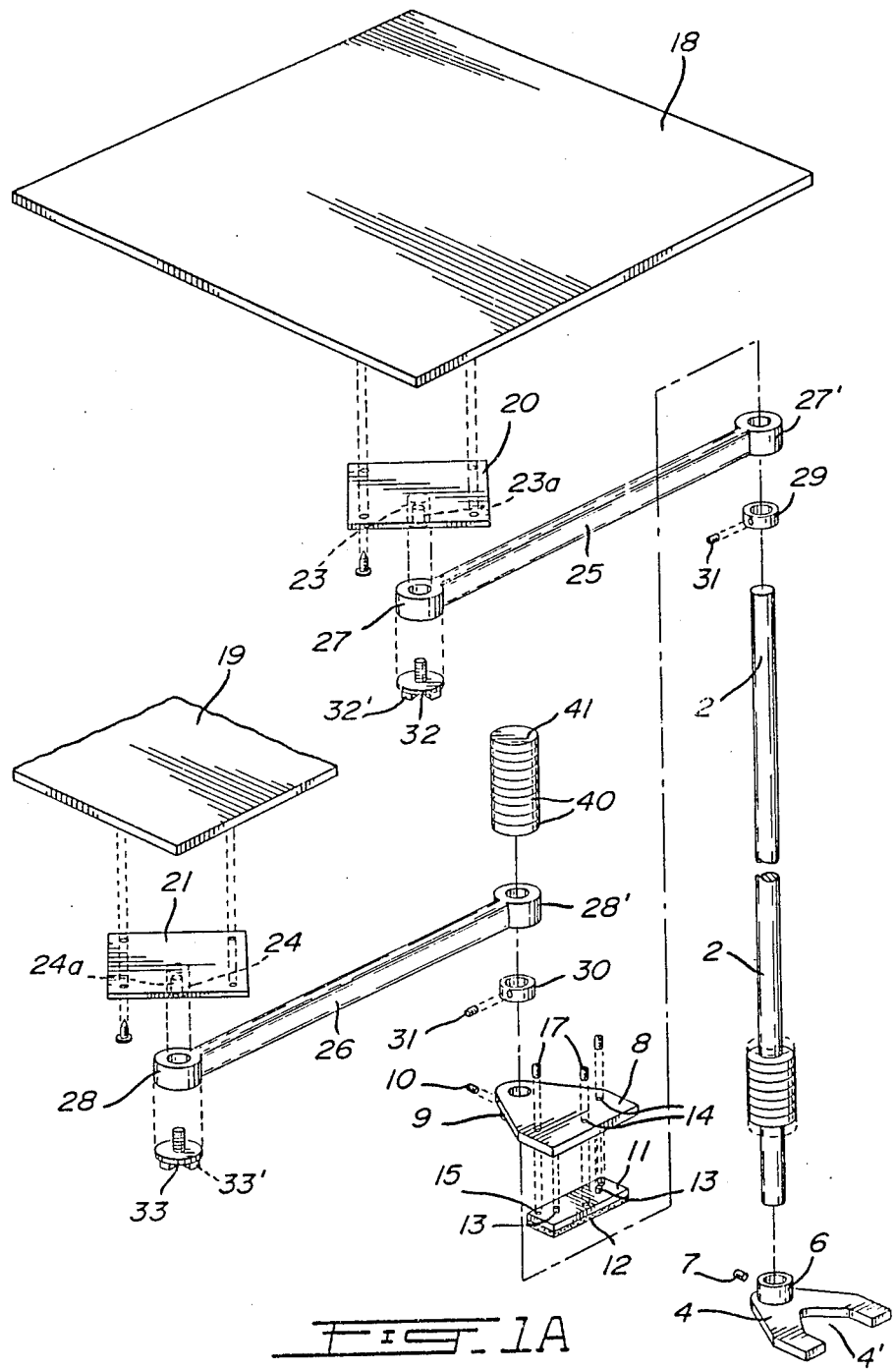
FIG. 1a is an exploded perspective view of the arrangement shown in FIG. 1.

A first arrangement of the parts of the invention is shown in FIGS. 1, 1a, and 4, as attached to an office desk 3 of the type in which the underface 3' is very close to floor 16. An upright cylindrical post 2, preferably made of steel and preferably hollow, is adapted for detachable attachment to desk 3 and is provided with an attachment assembly therefor. The latter consists of a generally triangular lower clamping plate member 4 having a similarly-shaped notch 4'. The latter is for a leg 5 of desk 3 to fit thereinto. Plate 4 is also provided with a vertically-oriented open-ended sleeve 6 at its apex, sleeve 6 slidably receiving the lower end of post 1. The primary locking means for clamping plate 4 consists of a first set-screw 7 threadedly engaged in sleeve 6.

The attachment assembly further consists of another generally triangular, upper clamping plate 8, which does not have a notch. Member 8, like member 4, has a sleeve 9 provided with a second set-screw 10 by which member 8 can be secured to post 1, screw 10 constituting the other part of the primary locking means.

A secondary locking means is further provided in association with upper member 8. The means comprises: a small rectangular flat plate 11 having glued or otherwise secured to its underside a compressible pad 12. Plate 11 has a pair of spaced-apart guide pins 13, which are insertable into corresponding guide pin holes (not seen) made in the underside of plate member 8. The latter has three threaded perforations 14 in registry with three shallow notches 15 provided in the top face of flat plate 11. Perforations 14 have threadedly-engaged secondary set-screws 17.

The installation of post 1 adjacent desk 3 is accomplished simply. Firstly, the post is inserted into lower clamping plate 4, so that it contacts the floor 16 either directly or with the intermediary of a floor pad 16a. Lower clamping plate 4 is then adjusted upwardly along post 1 until it presses against desk underface or under edge 3, and is then locked into place by means of set-secrew 7. It is essential that post 1 be in floor-engaging relation for firm and strong support. Then upper clamping plate 8 is placed over the top surface 3 of desk 3 and locked into place by the second set-screw 10. Vise action is effected by screwing the secondary set-screws 17 into the respective shallow notches 15 of flat plate 11, thereby forcing plate 11 downwardly and compressing pad 12, since triangular plate 8 is held in locked position by the primary locking means.

In order to prevent post 1 from slipping against floor 16, pad 16a as well as the lower surface of plate member 4 are desirably provided with material known under the trademark <VELCRO>, if floor 16 is covered with a rug, or with rubber if the floor is made of tile or linoleum.

It should be noted that, if desk underface 3' leaves rest directly on the floor and suitable shims inserted between plate 4 and surface 3'.

FIG. 1 and FIG. 1a advantageously show two vertically-spaced support tables 18 and 19, one above and one below upper plate 8. The tables are rectangular, horizontal and made of agglomerated woodchips covered with melamine. For instance, upper table 18 measures 16"×20", while lower table 19 measures 10' by 20' to support a computer video display and keyboard, respectively. Each table 18, 19 is fixed to an underlying support plate 20, 21, respectively, and each plate 20, 21 has a centrally-located, downwardly projecting pin 23, 24, respectively.

Tables 18 and 19 are mounted each on one of two identical arms 25, 26. These arms are characterized by eyes 27, 27',28, 28', respectively at both their opposite ends. The outer eyes 27, 28 receive pins 23, 24, respectively, while the other two inner eyes 27', 28' are slidably mounted on post 1. Both arms ar provided with vertical position lock means consisting of collars 29, 30 having set-screws 31.

Both pins 23, 24 have a small threaded bore 23a, 24a adapted to receive capped bolts 32, 33, respectively, each cap having integrally-formed ears 32', 33' to render the rotation of the caps easier.

Thus, as suggested in FIG. 3, tables 18, 19 are adapted to be selectively rotated to any desired position and releasably locked thereat by the locking caps. Tables 18, 19 are also free to pivot bodily with their respective arms about the axis of post 1.

Referring now to FIGS. 2, 2a, and 5, there is depicted a second arrangement of the same parts of the accessory table. Such embodiment is suitable for a desk or work table 34 having a side 35 and laterally projecting edge 36. As shown in the figures, all the elements described above are utilized in the second arrangement with the following exceptions: a special floor-engaging base is provided, since lower plate 4 is inverted and located under edge 36 so that plate 11 can exert vise action on the latter, as in the first arrangement. The base is comprised of a small disk 37 having an upper sleeve portion 37'; a threaded stud 38 is rigidly centrally secured inside sleeve portion 37'. The lower end portion of post 1 has a complementary threaded bore 39 adapted to receive stud 38. Thus, base 37 can be unscrewed to firmly contact floor 16 after lower clamping plate 4 has been secured to post 2. Base 37 is installed in the arrangement of FIG. 1 whenever there is a sufficient gap between floor 6 and desk underface 3'.

The assembly is preferably provided with an aesthetic finish sheath consisting of a plurality of doughnut-shaped sections 40 inserted around post 1. Sections 40 are preferably made of polyurethane foam. This sheath can be entire lengths of single-piece sleeves cut to size. An uppermost closure cap 41 may be provided.

Ideally, post 1 will be located no more than approximately six inches from the side of a desk, table or other article.

It is to be noted that the two support tables can carry up to 200 pounds of equipment.

It is to be further noted that the attachment assembly will not release accidentally and that no damage to the article of furniture is possible with pad 12. Moreover, the attachment assembly will fit any furniture, having an intermediately-located bottom surface (between the floor and the top surface of the furniture article).

What we claim is:

1. For use with a deck or similar article of furniture resting on a floor and defining a top, upwardly-facing, horizontal work surface and a lower, downwardly-facing, horizontal surface which is downwardly spaced from said top surface and upwardly spaced from said floor, an accessory table assembly comprising a cylindrical post having a lower end and an upper end, a floor pad, bolt means to adjustably fix said floor pad to said lower end axially of said post, an upper and a lower clamp plate, each having an open-ended sleeve at one end normal to the plane of the clamp plate, each sleeve slidably receiving said post, setscrew means carried by each sleeve and engageable with said post to adjustably secure each clamping plate axially of said post with each plate extending laterally of said post and in the same direction, said upper clamp plate having an exposed top face and an underface, a pressure plate underlying said underface, a cushion pad underlying and secured to said pressure plate and fine adjustment screw means threaded through said upper clamp plate and engaging said pressure plate to adjust the vertical spacing of the latter below said upper clamp plate, and screw means operatively accessible at said top face of said upper clamp plate, at least one swing-arm having an inner end and an outer end, said inner end having a sleeve rotatably and axially receiving said post, a collar slidable on said post, means to adjustably fix said collar on said post, axially thereof, to support said arm sleeve at an adjusted level while alllowing swinging of said arm in a generally horizontal plane, a table carried by the other end of said arm, rotatable relative to the latter about a vertical axis, and means to releasably lock said table to said arm in any orientation, whereby said post is adapted to be mounted on the side of said article of furniture with said lower clamp plate in a position extending under and engaging said lower surface and said upper clamp plate, and said pressure plate extending in a position over said top surface with said cushion pad engaging said top surface, said setscrew means securing said upper and lower clamp plates in said positions and with said cushion pad compressed against said top surface by said fine adjustment screw means and with said foot pad pressed against said floor by adjustment of said bolt means.

* * * * *